(12) United States Patent
Kamiya et al.

(10) Patent No.: US 11,575,805 B2
(45) Date of Patent: Feb. 7, 2023

(54) INFORMATION PROCESSING APPARATUS AND INFORMATION PROCESSING SYSTEM TO PROCESS DOCUMENT INVOLVING USER AUTHENTICATION

(71) Applicant: FUJIFILM Business Innovation Corp., Tokyo (JP)

(72) Inventors: Shigeki Kamiya, Kanagawa (JP); Tetsuo Iyoda, Kanagawa (JP); Takuya Masuda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/931,423

(22) Filed: Jul. 16, 2020

(65) Prior Publication Data
US 2021/0306523 A1 Sep. 30, 2021

(30) Foreign Application Priority Data
Mar. 25, 2020 (JP) .............................. JP2020-054872

(51) Int. Cl.
*H04N 1/44* (2006.01)
*G06F 3/12* (2006.01)

(52) U.S. Cl.
CPC ......... *H04N 1/4433* (2013.01); *G06F 3/1222* (2013.01); *G06F 3/1238* (2013.01); *G06F 3/1296* (2013.01)

(58) Field of Classification Search
None
See application file for complete search history.

(56) References Cited

U.S. PATENT DOCUMENTS

| | | | |
|---|---|---|---|
| 2004/0117389 A1* | 6/2004 | Enami | G06F 3/1285 |
| 2007/0133033 A1* | 6/2007 | Mizutani | H04N 1/00915 358/1.14 |
| 2010/0253964 A1* | 10/2010 | Isshiki | G06F 3/1285 358/1.14 |
| 2018/0039772 A1* | 2/2018 | Tokumoto | H04N 1/4426 |
| 2018/0267965 A1 | 9/2018 | Iyoda et al. | |
| 2018/0268155 A1 | 9/2018 | Kamiya et al. | |
| 2018/0268157 A1 | 9/2018 | Kamiya et al. | |

FOREIGN PATENT DOCUMENTS

| | | |
|---|---|---|
| JP | 2006243868 | 9/2006 |
| JP | 2018156383 | 10/2018 |
| JP | 2018156409 | 10/2018 |
| JP | 2018156410 | 10/2018 |
| JP | 2018156411 | 10/2018 |

\* cited by examiner

*Primary Examiner* — Thomas D Lee
(74) *Attorney, Agent, or Firm* — JCIPRNET

(57) ABSTRACT

An information processing apparatus comprises a processor configured to: authenticate a user designated as a utilizer of a document; enable the authenticated user to instruct a processing apparatus to perform processing of the document, the processing apparatus being different from the information processing apparatus; and disable the authenticated user to access the document from the information processing apparatus.

21 Claims, 8 Drawing Sheets

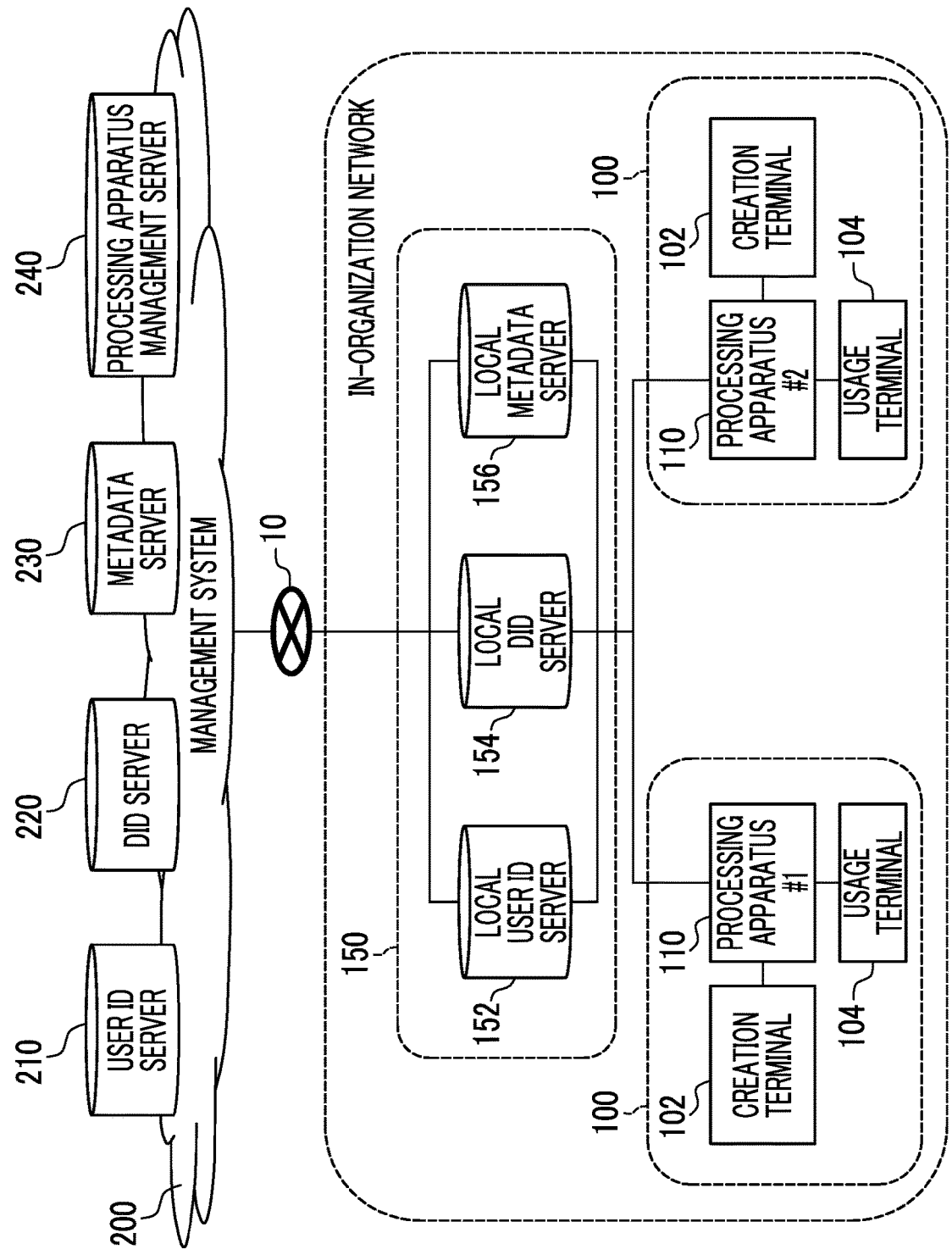

INFORMATION PROCESSING APPARATUS AND INFORMATION PROCESSING SYSTEM TO PROCESS DOCUMENT INVOLVING USER AUTHENTICATION

CROSS-REFERENCE TO RELATED APPLICATIONS

This application is based on and claims priority under 35 USC 119 from Japanese Patent Application No. 2020-054872 filed Mar. 25, 2020.

BACKGROUND

(i) Technical Field

The present invention relates to an information processing apparatus and an information processing system.

(ii) Related Art

A system is known for transmitting an electronic document to an apparatus of a transmission destination and enabling a user of the apparatus of the transmission destination to use the document. JP2006-243868A discloses a content authentication system including a creator terminal used by a creator of content, and a user terminal used by a utilizer of the content. The creator terminal includes a fingerprint authentication code database which stores a fingerprint authentication code of the user who sets a usage right of the content. In a case where the content is created, the creator of the content causes a header of the content to include the fingerprint authentication code of the user to which the usage right of the content is given and the user who shows the usage right given to each user. In a case where the content is created, the usage right according to each user can be set for a plurality of users.

SUMMARY

By the way, in a case where processing is performed on a document in an apparatus used for authentication by a user who uses the document, there is a case where security of the document deteriorates. For example, in a case where there are many people around the apparatus used for the authentication and the processing is executed on the document in the apparatus used for authentication, there is a possibility that content of the document is leaked to another person.

Aspects of non-limiting exemplary embodiments of the present disclosure relate to an information processing apparatus and an information processing system that enable the processing to be executed without executing the processing on the document in the apparatus used for the authentication by the user who uses the document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising a processor configured to: authenticate a user designated as a utilizer of a document; enable the authenticated user to instruct a processing apparatus to perform processing of the document, the processing apparatus being different from the information processing apparatus; and disable the authenticated user to access the document from the information processing apparatus.

BRIEF DESCRIPTION OF THE DRAWINGS

Exemplary embodiment(s) of the present invention will be described in detail based on the following figures, wherein:

FIG. 8 is a diagram showing an example of a system configuration provided with an in-organization management system.

DETAILED DESCRIPTION

Figure 1:
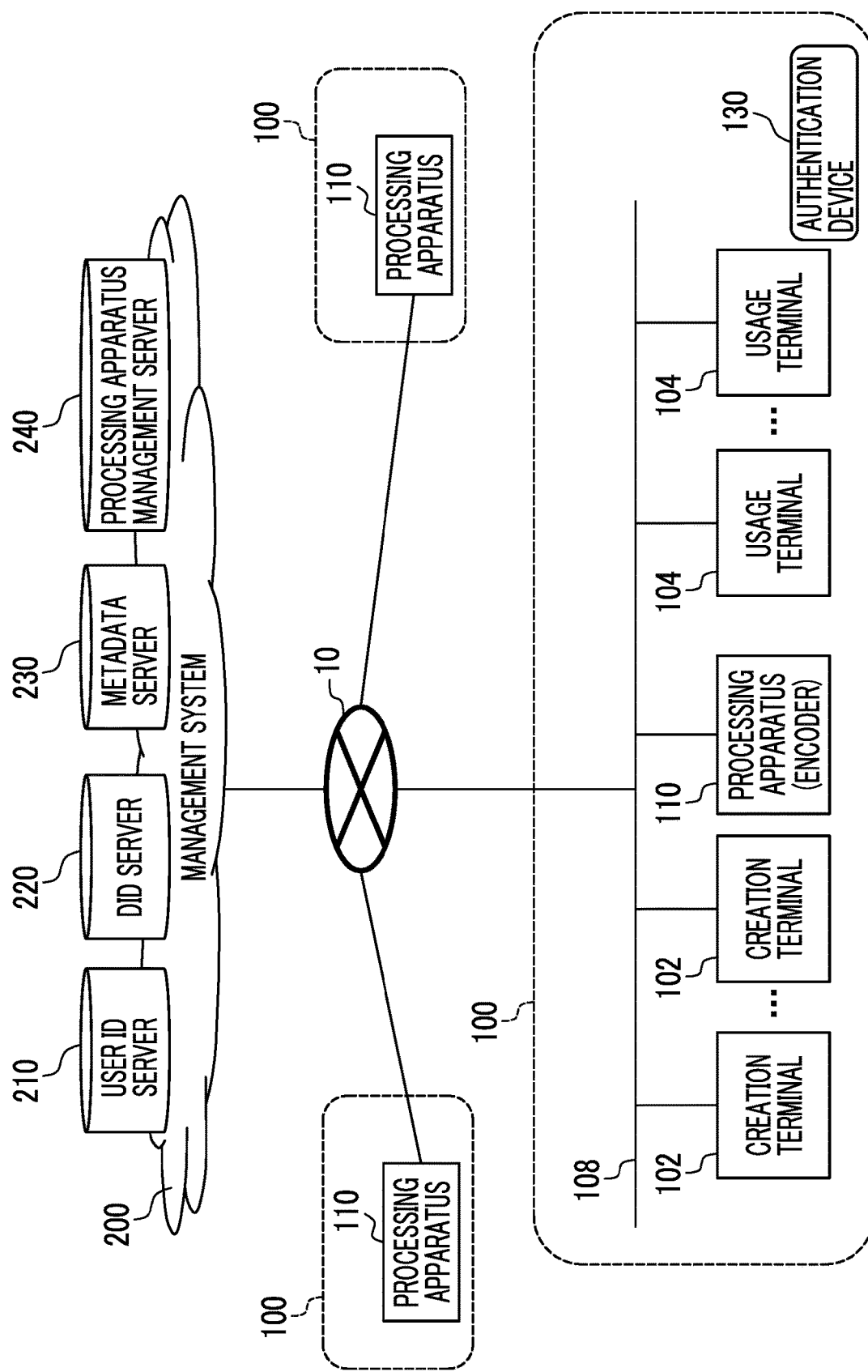
FIG. 1 is a diagram showing an example of a configuration of a document management system.

FIG. 1 shows a schematic configuration of one exemplary embodiment of a document management system which is an example of an information processing system. Note that, the document management system shown in FIG. 1 is the same system as document management systems (for example, systems disclosed in JP2018-156409A, JP2018-156410A, JP2018-156411A, and JP2018-156383A proposed by the applicant.

The document management system of the exemplary embodiment aims to provide an environment, in which electronic documents can be securely used, and to reduce a risk of leakage of information on the documents. Here, the document is content data capable of being circulated as one unit (for example, one file), and a type of data is not particularly limited. For example, concept of the document includes text data, document data created by word processing software, spreadsheet data created by spreadsheet software, Computer Aided Design (CAD) data, image data, video data, audio data, multimedia data, page data displayed on a web browser, the other data, which is created, edited, or browsed on a PC to be a print-out target, and the like.

The document management system includes a plurality of local systems 100 and a management system 200 that performs management (particularly, management of a processing system which will be described later) related to the local systems. The management system 200 can communicate with each of local system 100 through a wide area network 10 such as the Internet.

The local system 100 includes one or more creation terminals 102, one or more usage terminals 104, and a processing apparatus 110, which are connected to a local network 108. The local network 108 is a private network (for example, configured as a LAN) provided in an organization such as a company, and is protected from the wide area network 10 using a firewall or the like. Basically, one processing apparatus 110 is installed in the local system 100.

In a case where the private network in the organization is in large scale, an individual network segment that configures the private network may be set as each local system 100, and the processing apparatus 110 may be installed in each of the local systems 100 one by one. For example, the network segment in a living room for each department of a certain company becomes the local system 100 of each department, and one processing apparatus 110 is installed in the segment. In the example, the local system 100 having the processing apparatus 110 as a core is formed for each company or for each department of each company, and each processing apparatus 110 is managed by a central management system 200.

The creation terminal 102 is a terminal used to create a document, and includes, for example, a desktop or a notebook-type personal computer, a workstation, a tablet terminal, a smartphone, a multifunction peripheral, a scanner, a facsimile apparatus, a digital camera, and the like as an example. An application for creating and editing the document is installed in the creation terminal 102. In addition, software for requesting the document management system to distribute the created document is installed in the creation terminal 102. As a form of the software, implementation as a device driver for exchanging information with the processing apparatus 110 which will be described later, implementation by a Web application, or the like is conceivable. The creation terminal 102 corresponds to an example of a transmission source apparatus.

The processing apparatus 110 executes, as an example, protection processing of converting the document created by the creation terminal 102 into a protected document (hereinafter, also referred to as an "eDoc file") which is a form used in the secure environment provided by the document management system of the exemplary embodiment. The protection processing may be processing of encoding an original document into the eDoc file, and, in this sense, the processing apparatus 110 is a type of an encoder. In the protection processing, the document is converted into, for example, data in a dedicated format designed for the system of the exemplary embodiment, and is encrypted in a form capable of being decrypted only by a user designated as a distribution destination of the document. Either format conversion or encryption may be performed first.

The protection processing is only an example of processing executed by the processing apparatus 110, and the processing apparatus 110 may perform processing other than the protection processing on the original document created by the creation terminal 102. That is, the protected document is an example of a processed document generated in such a way that the processing apparatus 110 performs the processing on the original document, and the protection processing is only an example of the processing. For example, the processing apparatus 110 may generate a document whose format is converted by performing the format conversion processing on the original document without performing the encryption processing, or may generate the encrypted document by performing the encryption processing on the original document without performing the format conversion processing. The document generated as above also corresponds to the example of the processed document generated through the processing performed by the processing apparatus 110. Hereinafter, although an example, in which the eDoc file is generated through the protection processing and the eDoc file is handled, will be described as an example, a file handled in the exemplary embodiment is not limited to the eDoc file and may include a document other than the eDoc file, which is generated by performing the processing other than the protection processing. As will be described later, although, for example, the eDoc file is a document which becomes a printing target, the document other than the eDoc file, which is generated by performing the processing other than the protection processing, may be the printing target.

The processing apparatus 110 may execute processing, such as printing, on the protected document. For example, in a case where the user gives a print instruction for the protected document using the usage terminal 104, the processing apparatus 110 prints the protected document of the printing target according to the print instruction. Note that, the processing, such as printing, may be executed by an apparatus other than the processing apparatus 110.

In addition, the processing apparatus 110 creates metadata of the protected document and registers the created metadata in the management system 200 which is a higher-level system. The metadata includes bibliographic items of the protected document, information on the distribution destination, information on a key used by each distribution destination to release the encryption of the protected document, and the like. The metadata includes a plurality of items, and grant, edition, and update of data are executed from a corresponding device or the user according to a function provided in a service.

As an example, a part of the items is designated by the user who instructs to register a document for the document management system, and another part is created by the processing apparatus 110. In addition, the management system 200 or the usage terminal 104 may set a value of a partial item of the metadata.

As an example, the processing apparatus 110 may transmit the generated protected document (eDoc file) to the usage terminal 104 of the distribution destination designated by the user. In a case where processing other than the protection processing is performed and the document other than the eDoc file is generated, the document may be transmitted to the usage terminal 104. The processing apparatus 110 may not transmit the protected document to the usage terminal 104 of the distribution destination, and may transmit information prompting the user to have user authentication for permission of giving an instruction to execute the processing, such as printing, on the protected document to the usage terminal 104 of the distribution destination.

The protected document, that is, the eDoc file is obtained by converting the original document into a dedicated format and performing encryption, and is also referred to as a body of the eDoc. In order to enable the processing, such as printing, to be performed on the eDoc file, corresponding metadata is required. A complete protected document, on which the processing, such as printing, is possible, is configured together with the eDoc file and the metadata. As above, a set of the eDoc file and the metadata corresponding to the eDoc file is referred to as "eDoc" below.

The processing apparatus 110 may be installed with a function of an access point of a wireless LAN. In this case, the usage terminal 104 can communicate with the processing apparatus 110 through the wireless LAN.

As an example, the usage terminal 104 is a terminal used to give the instruction to execute the processing, such as printing, on the protected document (eDoc file). In the exemplary embodiment, in the usage terminal 104, processing, such as printing, browsing, or editing, is not permitted to be executed on the protected document, and the processing and an operation for the processing are prohibited. Here, the "browsing" means that the protected document is used in an aspect according to information content represented by the document. For example, in a case where the protected document includes a document, such as word processing data or a drawing, as the information content, the browsing indicates that the user reads or views the document displayed on the usage terminal 104. In addition, in a case where the information content represented by the protected document is voice, the browsing indicates that the user listens to the voice played by the usage terminal 104. Note that, a name or the like of the protected document may be displayed on the usage terminal 104. The usage terminal 104 corresponds to an example of an information processing apparatus or a transmission destination apparatus. Note that, in a case where the document other than the eDoc file is generated by performing the processing other than the protection processing, the usage terminal 104 is used to give the instruction to execute the processing, such as printing, on the document.

In addition, in the exemplary embodiment, as an example, an authentication device 130 carried by the user is used as a tool for authenticating the user who uses the document management system of the exemplary embodiment. The authentication device 130 is a device, such as an IC card, which is installed with identification information unique to the user who carries the device, and which executes data processing for the user authentication in response to a request from an external device. The authentication device 130 may be a mobile terminal, such as a smart phone, installed with a function equivalent to the IC card for personal authentication. The usage terminal 104 and the creation terminal 102 have a function of communicating with the authentication device 130 using a wireless communication protocol such as Near Field Communication (NFC). The usage terminal 104 and the creation terminal 102 exchange information for the user authentication in conformity to a prescribed protocol with the authentication device 130, and authenticate the user carries the authentication device 130. Alternatively, a method may be performed in which the actual user authentication is executed by a server side of the document management system, such as the processing apparatus 110 and the management system 200, of the exemplary embodiment and the usage terminal 104 and the creation terminal 102 mediate data transmission between the server side and the authentication device 130. In addition, the usage terminal 104 and the creation terminal 102 may be equipped with a function of the authentication device 130.

The management system 200 manages the processing apparatus 110 in each local system 100. In addition, the management system 200 manages the metadata of the protected document generated by each of the processing apparatuses 110, and provides the metadata in response to the request to the usage terminal 104. The management system 200 is configured by one computer or a plurality of computers that can communicate with each other, and has functions of a user ID server 210, a DID server 220, a metadata server 230, and a processing apparatus management server 240.

The user ID server 210 is a server that manages information on each user who uses the document management system. There are two levels of users who use the document management system. One is a contractor who makes a contract for usage of the document management system with an operator of the system, and the other is a general user who actually uses the system under the contract to perform registration or the like of the document. For example, it is assumed that there are many cases where a company is a contractor, the processing apparatus 110 is installed on the local network 108 of the company, and an employee of the company uses the document management system through the processing apparatus 110 as a general user. The user ID server 210 holds and manages information about each of the contractor and the general user.

The DID server 220 manages a document ID (DID) which is Identification Information (ID) of the protected document. Although the processing apparatus 110 that creates the protected document actually grants the DID to the protected document, the DID server 220 grants an issuance right and an issuance frame (issuance number) of the DID to the processing apparatus 110, and receives and records a report of the DID, which is actually issued by the processing apparatus 110, in the issuance right and issuance frame. As a result, the DID server 220 suppresses generation of an illegal DID and is capable of detecting a document having the illegal DID.

The metadata server 230 holds and manages the metadata of the protected document (eDoc file) generated by the processing apparatus 110. In a case where the metadata of the protected document is requested by the user through the usage terminal 104, the metadata server 230 provides the metadata to the usage terminal 104 in a case where the user is a legitimate person. Note that, a fact that the user who requests the metadata is the "legitimate person" for the metadata server 230 indicates a case where a combination of the user and the usage terminal 104 used in a case where the user issues the request corresponds to a combination of a distribution destination user, who is indicated in distribution destination information (which will be described in detail later) in the metadata held by the metadata server 230 in association with the DID (included in the request) of the eDoc file, and the usage terminal 104 of the distribution destination.

The processing apparatus management server 240 is a server that manages a status (state) of each processing apparatus 110.

Figure 2:
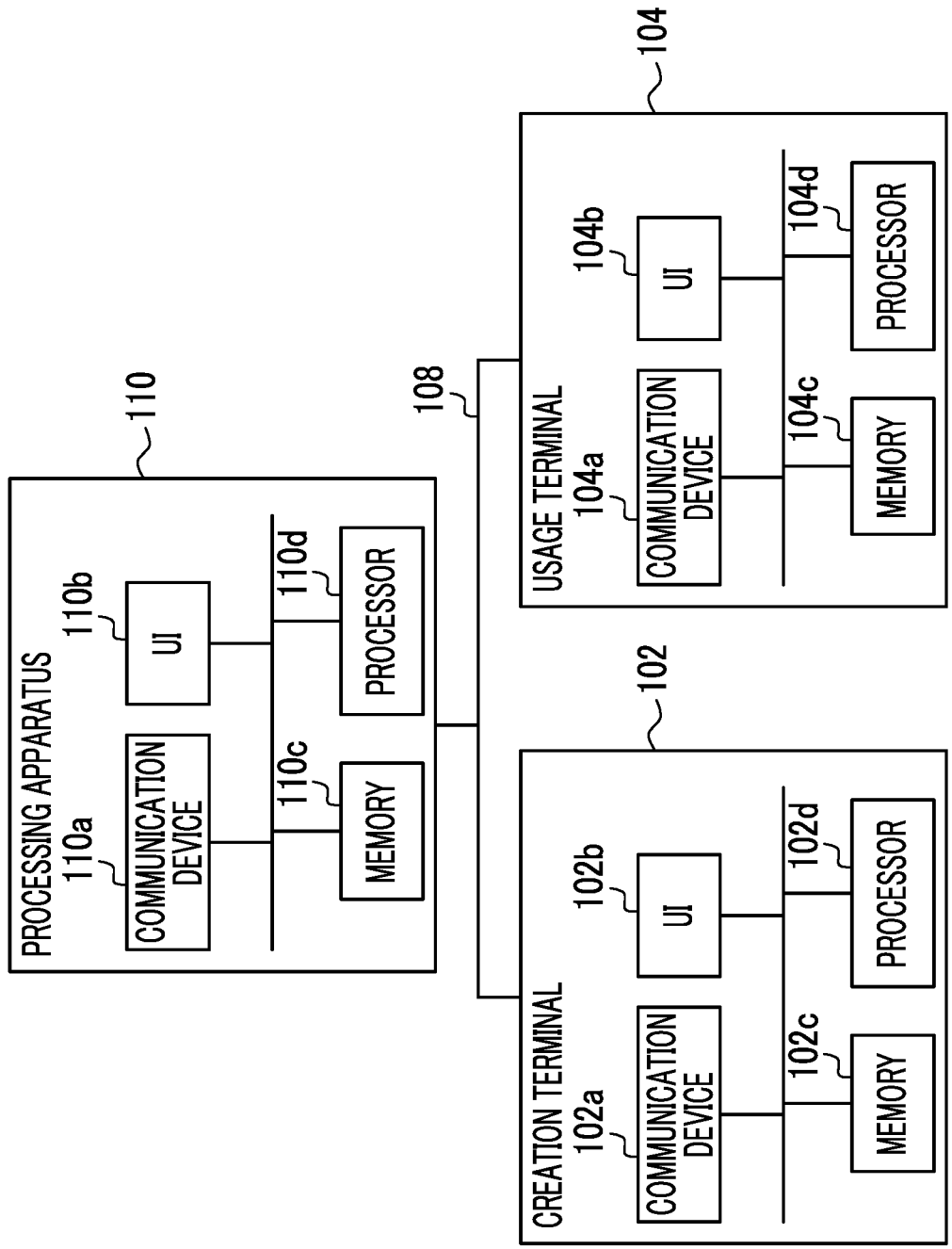
FIG. 2 is a diagram showing an example of a hardware configuration of a creation terminal, a processing apparatus, and a usage terminal.

Hereinafter, a hardware configuration of each of the creation terminal 102, the processing apparatus 110, and the usage terminal 104 will be described with reference to FIG. 2. FIG. 2 shows an example of the hardware configuration.

The creation terminal 102 includes, for example, a communication device 102a, a UI 102b, a memory 102c, and a processor 102d.

The communication device 102a is a communication interface (for example, a network interface or the like) including a communication chip or the like, and has a function of transmitting data to another device or system and a function of receiving data transmitted from another device or system.

The UI 102b is a user interface and includes at least one of a display device or an operation device. The display device is a liquid crystal display, an EL display, or the like. The operation device is a keyboard, input keys, an operation panel, or the like. The UI 102b may be a UI, such as a touch panel, having both the display device and the operation device.

The memory 102c is a device that configures one or more storage areas for storing data. The memory 102c is, for example, a hard disk drive, various types of memories (for example, a RAM, a DRAM, a ROM, and the like), the other storage devices (for example, an optical disk and the like), or a combination thereof.

The processor 102d is configured to control an operation of each unit of the creation terminal 102. The processor 102d may include a memory. A function of the creation terminal 102 is realized by the processor 102*d*. The processor 102*d* corresponds to an example of a first processor.

The processing apparatus 110 includes, for example, a communication device 110*a*, a UI 110*b*, a memory 110*c*, and a processor 110*d*.

The communication device 110*a* is a communication interface (for example, a network interface or the like) including a communication chip and the like, and has a function of transmitting data to another device or system and a function of receiving data transmitted from another device or system.

The UI 110*b* is a user interface and includes at least one of the display device or the operation device. The display device is a liquid crystal display, an EL display, or the like. The operation device is a keyboard, input keys, an operation panel, or the like. The UI 110*b* may be a UI, such as a touch panel, having both the display device and the operation device.

The memory 110*c* is a device that configures one or more storage areas for storing data. The memory 110*c* is, for example, a hard disk drive, various types of memories (for example, a RAM, a DRAM, a ROM, and the like), the other storage devices (for example, an optical disk, and the like), or a combination thereof.

The processor 110*d* is configured to control an operation of each unit of the processing apparatus 110. The processor 110*d* may include a memory. A function of the processing apparatus 110 is realized by the processor 110*d*. The processor 110*d* corresponds to an example of a third processor.

The usage terminal 104 includes, for example, a communication device 104*a*, a UI 104*b*, a memory 104*c*, and a processor 104*d*.

The communication device 104*a* is communication interface (for example, a network interface or the like) including a communication chip and the like, and has a function of transmitting data to another device or system and a function of receiving data transmitted from another device or system.

The UI 104*b* is a user interface and includes at least one of a display device or an operation device. The display device is a liquid crystal display, an EL display, or the like. The operation device is a keyboard, input keys, an operation panel, or the like. The UI 104*b* may be a UI, such as a touch panel, having both the display device and the operation device.

The memory 104*c* is a device that configures one or more storage areas for storing data. The memory 104*c* is, for example, a hard disk drive, various types of memories (for example, a RAM, a DRAM, a ROM, and the like), the other storage devices (for example, an optical disk, and the like), or a combination thereof.

The processor 104*d* is configured to control an operation of each unit of the usage terminal 104. The processor 104*d* may include a memory. A function of the usage terminal 104 is realized by the processor 104*d*. The processor 104*d* corresponds to an example of a second processor.

Next, an example of data content of metadata 300 of the eDoc will be described with reference to FIG. 3.

In items included in the metadata 300, first, the "DID" is a document ID granted by the processing apparatus 110 that generates the eDoc. A "document name" is a name or a title of the eDoc.

A "distributor ID" is a user ID of a person who distributes the eDoc, that is, a person (hereinafter, referred to as a "distributor") who performs a document registration operation from the creation terminal 102 to the processing apparatus 110 and performs distribution through the processing apparatus 110.

An "encoding date and time" is a date and time at which the document from the creation terminal 102 is encoded (that is, the protection processing is performed) and the eDoc is created. A "processing apparatus ID" is identification information on the processing apparatus that executes the protection processing. "Encryption information" is information related to encryption in a case where the eDoc is generated, and includes a name of encryption software used for the encryption, a version of the encryption software, and key information representing a key for releasing (decrypting) the encryption. The key information is acquired by, for example, encrypting the key for decryption using a public key of each distribution destination user. "Keyword information" is a list of keywords extracted from the eDoc (or original data). The keyword information is used in a case of, for example, searching for the eDoc.

The "distribution destination information" is information representing the user and the usage terminal 104 designated as the distribution destination of the eDoc by the distributor. In the example of FIG. 3, the distribution destination information includes, for each distribution destination user, a user ID of the user and an ID (identification information) of the usage terminal 104 which should be used by the user. In a case where a plurality of usage terminals 104 are designated, a set of the user ID of the user and IDs of the plurality of usage terminals 104 is incorporated in the distribution destination information. Note that, the distribution destination information corresponds to an example of utilizer information or transmission destination information.

In addition, as another example, in a case where a method of enabling the distribution destination user to instruct to execute the processing on the eDoc using any of the usage terminals 104 designated as the distribution destination is employed, the distribution destination information includes a list of IDs of the distribution destination users and a list of IDs of the usage terminals 104 of the distribution destination. For example, there is a case where a shared terminal of the department, a terminal installed in a living room or a conference room of the department, or the like is assumed as a candidate for the usage terminal 104 of the distribution destination. Although it is not determined which user in the organization uses the shared terminal, the terminal installed in the living room (which is also a kind of shared terminal), or the like, the distributor knows at least a kind of the terminal and there is a low possibility that the terminal is taken out of the organization without permission, and thus the terminal is qualified as a distribution destination of a document which is a confidential target. In a case where the eDoc is used in the shared terminal whose feature is known as above, a usage form may be taken into consideration in which the distribution destination user may use any of the usage terminals 104 designated as the distribution destination.

"Access right information" is information representing a usage right for the eDoc, which is granted to the distribution destination user by the distributor. In the exemplary embodiment, the distribution destination user is permitted to print the eDoc file but is not permitted to use the eDoc file in the usage terminal 104. More specifically, the distribution destination user is permitted to instruct to execute printing of the eDoc file in the usage terminal 104 of the distribution destination but is not permitted to use the eDoc file as electronic data, for example, to perform the browsing or the editing in the usage terminal 104. The access right information is information representing content usage right. That is, the usage right granted to the distribution destination user is the printing of the eDoc file, and the usage right to execute the browsing or the editing on the eDoc file in the usage terminal 104 is not granted. The access right information is information indicating that the usage right granted to the distribution destination user includes the printing of the eDoc file and does not include the browsing or the editing in the usage terminal 104.

An "offline validity period" is information representing a length of a validity period of the metadata. That is, even in a case where the usage terminal 104 is in a state (offline state) of being not capable of accessing the management system 200, it is permitted to instruct to execute the processing, such as printing, on the eDoc using the usage terminal 104 in a case where the metadata which caches the eDoc exists in the "offline validity period" from a date and time at which the metadata is acquired. On the other hand, in a case where the offline validity period of the metadata which caches the eDoc is already expired in the offline state, it is not permitted to instruct to execute the processing, such as printing, on the eDoc using the usage terminal 104. Note that, in a case where the user instructs to execute the processing, such as printing, on the eDoc while the usage terminal 104 is capable of accessing the management system 200 (that is, online state), the newest metadata of the eDoc is acquired from the management system 200 (particularly, the metadata server 230) and is used.

"Original data information" is information indicating whether or not the original data before the eDoc is generated (encoded) is stored and information indicating a location in which the original data (for example, Uniform Resource Locator (URL)) is stored in a case where the original data is stored. Here, the original data is, for example, a document (obtained before the protection processing is performed) sent from the creation terminal 102 to the processing apparatus 110, application data which is the original of the document (for example, in a case where the document is page description language data, the data of the word processing software before the conversion into the data is performed), or both the document and the application data.

A "document acquisition date and time" is a date and time at which the usage terminal 104 acquires a file (that is, the eDoc file) of body data of the eDoc. A "metadata acquisition date and time" is a date and time at which the usage terminal 104 acquires the newest metadata of the eDoc, which is currently cached, from the management system 200. The document acquisition date and time and the metadata acquisition date and time are not included in the metadata held in the management system 200, and are automatically added to the metadata acquired by the usage terminal 104 from the management system 200 for management in the usage terminal 104.

Figure 3:
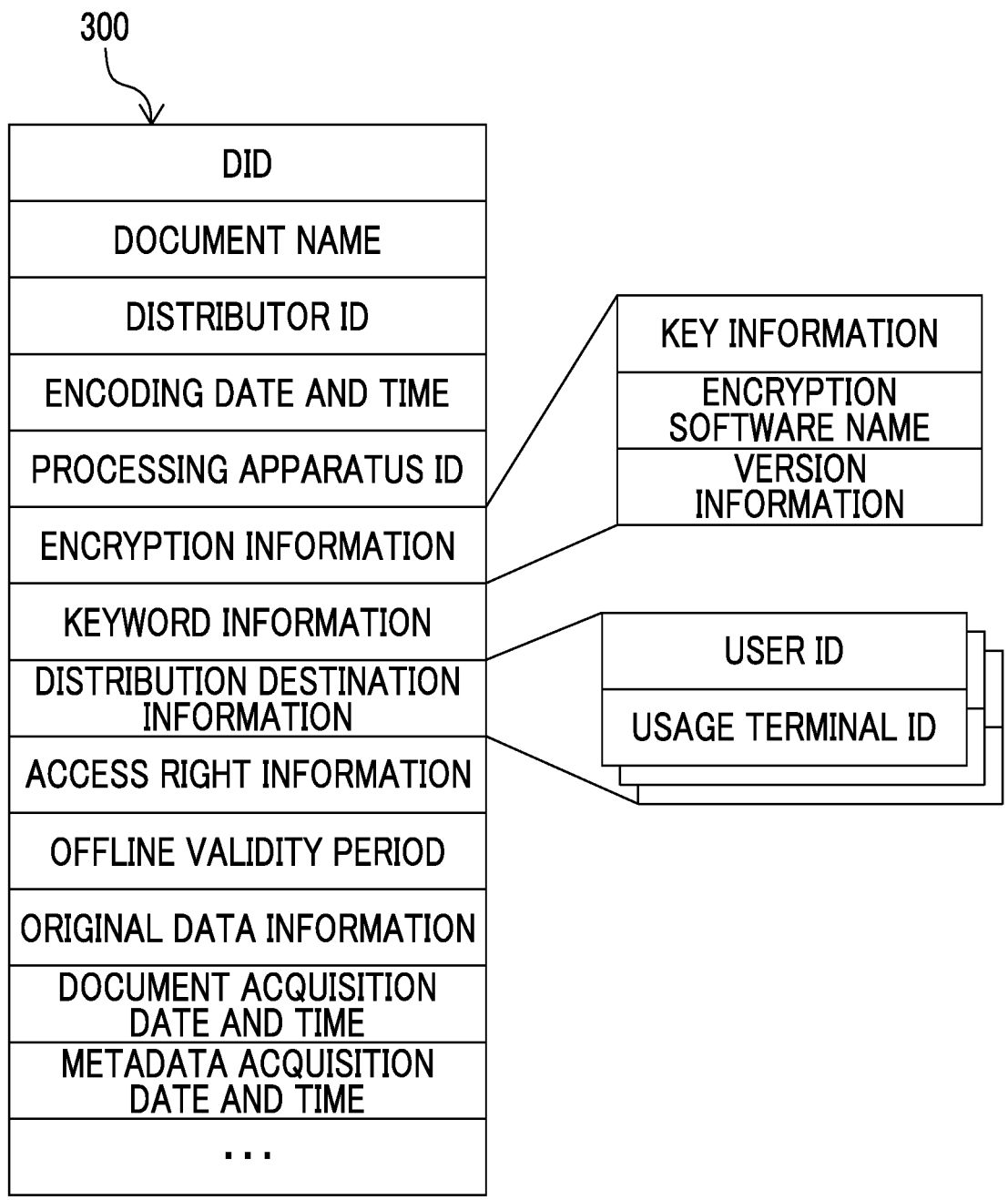
FIG. 3 is a diagram showing data content of metadata.

In addition, in the items of the metadata shown in FIG. 3, the DID, the encoding date and time, the processing apparatus ID, the encryption information, and the keyword information are information generated by the processing apparatus 110. In addition, the document name, the distributor ID, the distribution destination information, the access right information, the offline validity period, and the original data information are derived from the document or attribute data sent from the creation terminal 102 to the processing apparatus 110.

Next, data content of information managed by each of the servers 210 to 250 of the management system 200 will be illustrated.

Figure 4:
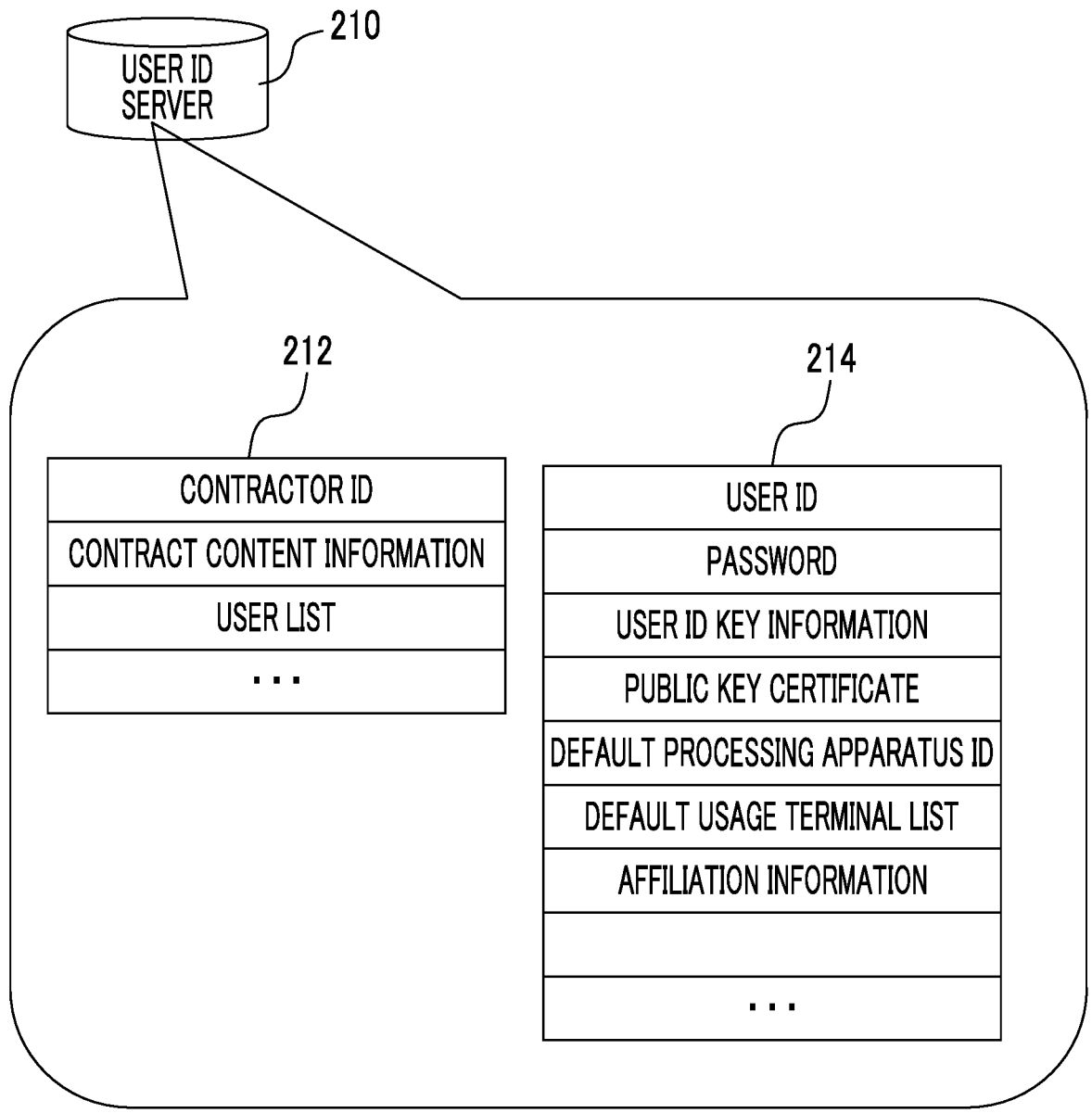
FIG. 4 is a diagram showing data content managed by a user ID server.

First, an example of the data content managed by the user ID server 210 will be described with reference to FIG. 4. The user ID server 210 is registered with contractor data 212 of each contractor and user data 214 of each general user.

The contractor data 212 includes a contractor ID, contract content information, and a user list. The contractor ID is identification information on the contractor (for example, an organization or a department within the organization) who contracts with the operator of the document management system. The user list is a list of user IDs of general users (for example, members who belong to the organization that is the contractor) who use the document management system according to the contract of the contractor.

The general user data 214 includes the user ID, a password, user ID key information, a public key certificate, a default processing apparatus ID, a default usage terminal list, and affiliation information on the general user. The user ID key information is authentication information on the user, which is used by the authentication device 130 of the user. The public key certificate is a digital certificate that certifies the public key of the user. The default processing apparatus ID is an ID of the processing apparatus 110 in which the user is registered. Normally, the user is registered in the processing apparatus 110 placed in an office to which the user belongs, and the processing apparatus 110 becomes the default processing apparatus for the user. The default usage terminal list is a list of IDs of one or more usage terminals mainly used by the user. The usage terminals included in the list are candidates for the distribution destination terminals in a case where the eDoc is distributed to the user. The affiliation information is information that specifies an organization to which the user belongs, a department thereof, or the like, and is, for example, a contractor ID of the organization or the department.

Figure 5:
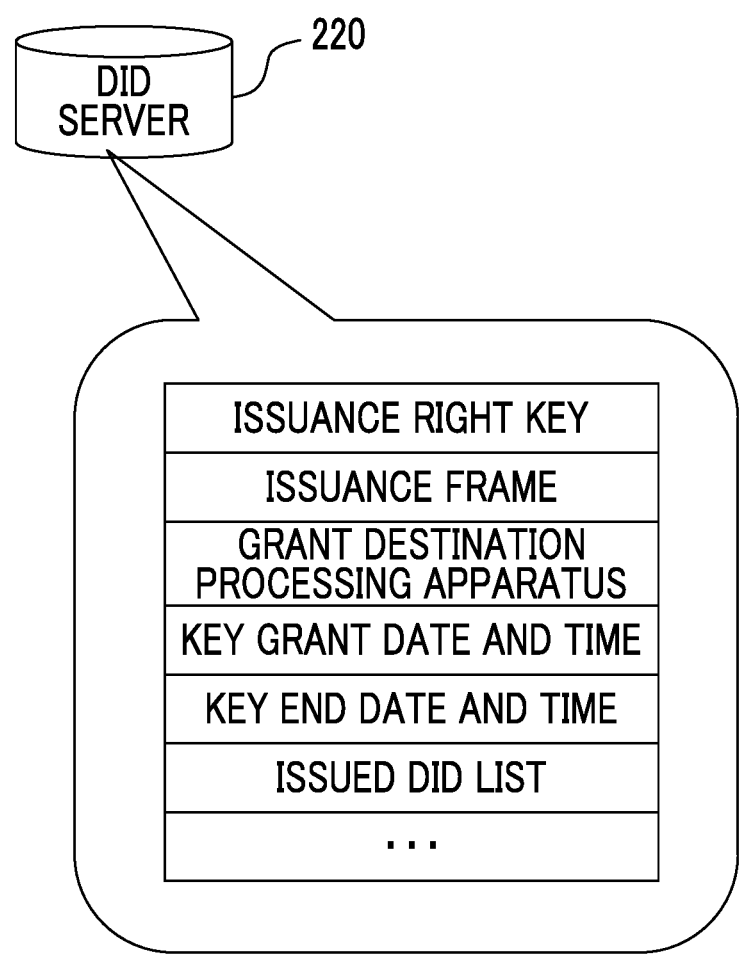
FIG. 5 is a diagram showing data content managed by a DID server.

Next, an example of data content managed by the DID server 220 is shown with reference to FIG. 5.

As shown in FIG. 5, for each issuance right key issued to the processing apparatus 110, the DID server 220 holds pieces of information on each item including the issuance frame, a grant destination processing apparatus, a key grant date and time, the key end date and time, and the issued DID list.

The issuance right key is key information (for example, a randomly generated text string) granted to the processing apparatus 110 by the DID server 220 to certify the DID issuance right. The processing apparatus 110 causes the DID issued from the processing apparatus 110 to include the issuance right key granted from the DID server 220, thereby certifying that the DID is issued under a proper issuance right.

The issuance frame is an upper limit DID issuance number (the upper limit number of documents to which the DID can be granted) granted to the processing apparatus 110, together with the issuance right key. In a case where a pair of the issuance right key and the issuance frame is granted to the processing apparatus 110 from the DID server 220, unique DIDs can be granted to the eDocs up to the upper limit number indicated by the issuance frame.

The grant destination processing apparatus indicates the ID of the processing apparatus 110 which is a grant destination of the issuance right key (and the issuance frame). The key grant date and time is a date and time at which the issuance right key is granted to the processing apparatus 110. The key end date and time is a date and time at which the processing apparatus 110 of the grant destination finishes using the issuance right key. That is, the key end date and time is a date and time at which the processing apparatus 110 finishes granting the DIDs to the eDocs corresponding to the upper limit number indicated by the issuance frame granted together with the issuance right key. Note that, in a case where the processing apparatus 110 employs a mechanism of requesting a subsequent issuance right key and an issuance frame to the DID server 220 after the issuance frame is used up, a key end date and time of a certain issuance right key (referred to as a first key) is not explicitly recorded and a key grant date and time of an issuance right key, which is granted to the processing apparatus 110, subsequent to the issuance right key may be used as a key end date and time of the first key. The issued DID list is a list of DIDs, which are issued by the grant destination processing apparatus 110 using the issuance right key, and issuance days, months, and years. The grant destination processing apparatus 110 notifies the DID server 220 of the DID each time at which the DID is issued using the issuance right key, and the DID server 220 adds the notified DID and an issuance day, month, and year of the DID to an issued DID list corresponding to the issuance right key included in the DID.

The metadata server 230 stores the metadata of each eDoc sent from each processing apparatus 110. The data content of the stored metadata is the same as the data content shown in FIG. 3. However, in the items of the metadata shown in FIG. 3, the item (the document acquisition date and time, the metadata acquisition date and time, or the like) used only in the usage terminal 104 is not managed in the metadata server 230.

Figure 6:
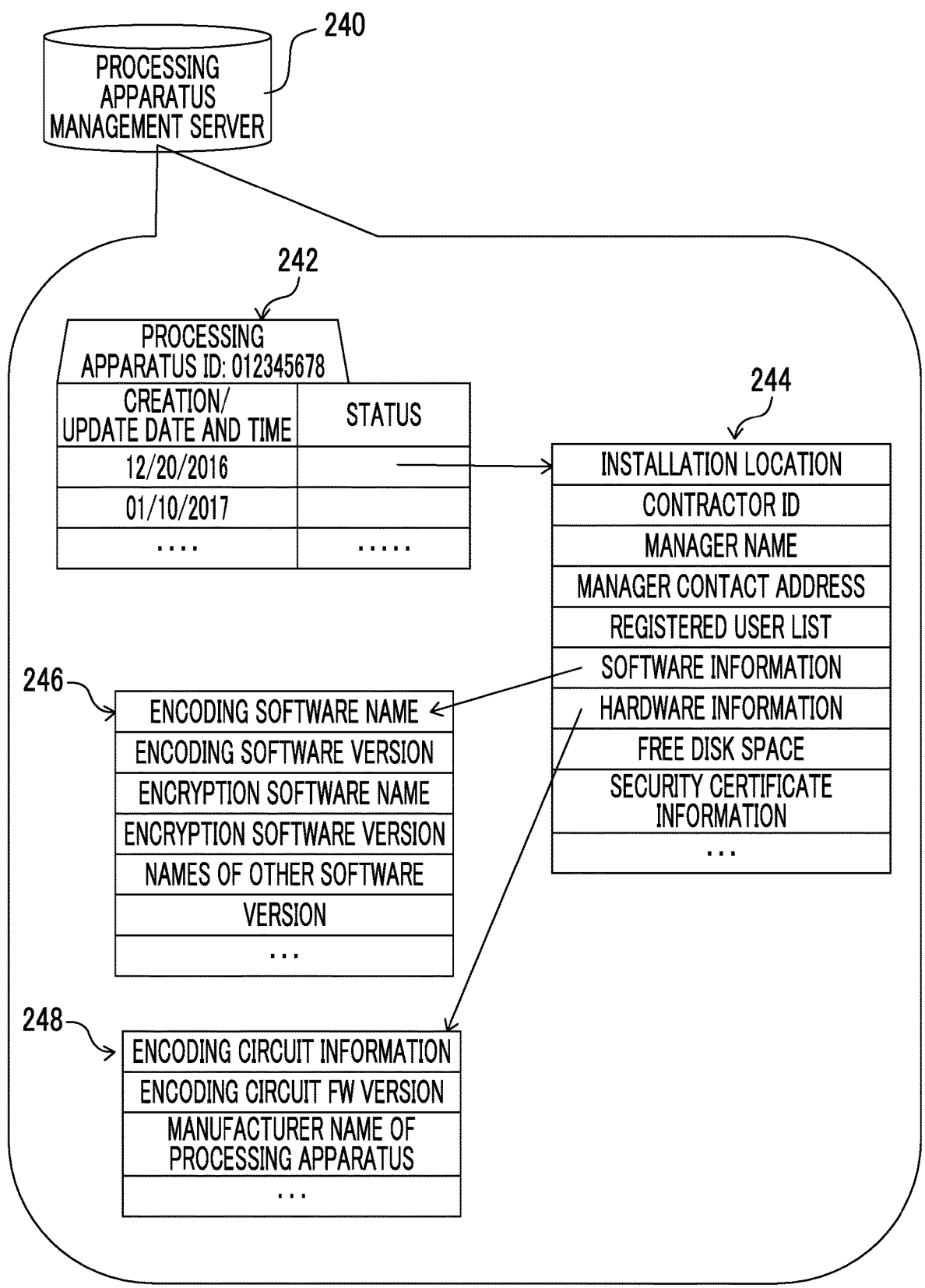
FIG. 6 is a diagram showing data content managed by a processing apparatus management server.

Next, data managed by the processing apparatus management server 240 will be described with reference to FIG. 6. The processing apparatus management server 240 stores a status history 242 of the processing apparatus 110 for each processing apparatus 110 which is a management target. The status history includes information on a status 244 of the processing apparatus 110 at a point in time of creation and individual update (creation and update date and time) in association with the ID of the processing apparatus 110.

The status 244 at the individual point in time includes an installation location, a contractor ID, a manager name, a manager contact address, a registered user list, software information 246, hardware information 248, a free disk capacity, and security certificate information. The installation location is information indicating an installation location of the processing apparatus 110 and includes, for example, information such as an address, a building name, and the number of floors. The contractor ID is an ID of a contractor who is using the processing apparatus 110. The manager name is a name of a manager of the processing apparatus 110. The manager is a user who manages the processing apparatus 110 in a department or the like of an installation destination of the processing apparatus 110. The manager contact address is information (for example, e-mail address) of a contact address of the manager. The registered user list is a list of user IDs of users registered in the processing apparatus 110 (in other words, users who set the processing apparatus 110 as the "default processing apparatus").

The software information 246 includes an encoding software name, an encoding software version, an encryption software name, an encryption software version, and names and versions of other software installed in the processing apparatus 110. Here, the encoding software is software that converts (encodes) the document input from the creation terminal 102 into a dedicated format of the document management system. The encryption software is software that encrypts the document (obtained through conversion into, for example, the dedicated format).

The hardware information 248 includes items such as encoding circuit information, an encoding circuit FW version, and a manufacturer name of the processing apparatus 110. The encoding circuit information is information indicating a model of the hardware circuit used for an encoding processing. The encoding circuit FW version is a version of a firmware (FW) of the encoding circuit.

The free disk capacity is a free capacity of a secondary storage device, such as a hard disk or a solid state disk, possessed by the processing apparatus 110 at the point in time.

The security certificate information is information specifying each security certificate installed in the processing apparatus 110 at the point in time (for example, information such as a subject identifier of the certificate, an issuer identifier, or an issuance date and time).

In addition, although not shown in the drawing to avoid complication, the status 244 includes a type of a font (a list of font names) installed in the processing apparatus 110, an address (for example, IP address) for network communication, a device ID of a mounted secondary storage device (a hard disk drive or the like), information indicating customized content for connecting the processing apparatus 110 to processing of a core system of an organization at an installation destination, and an installation date and time of an encryption key (for communication path encryption, signature, or the like) used by the processing apparatus 110.

Figure 7:
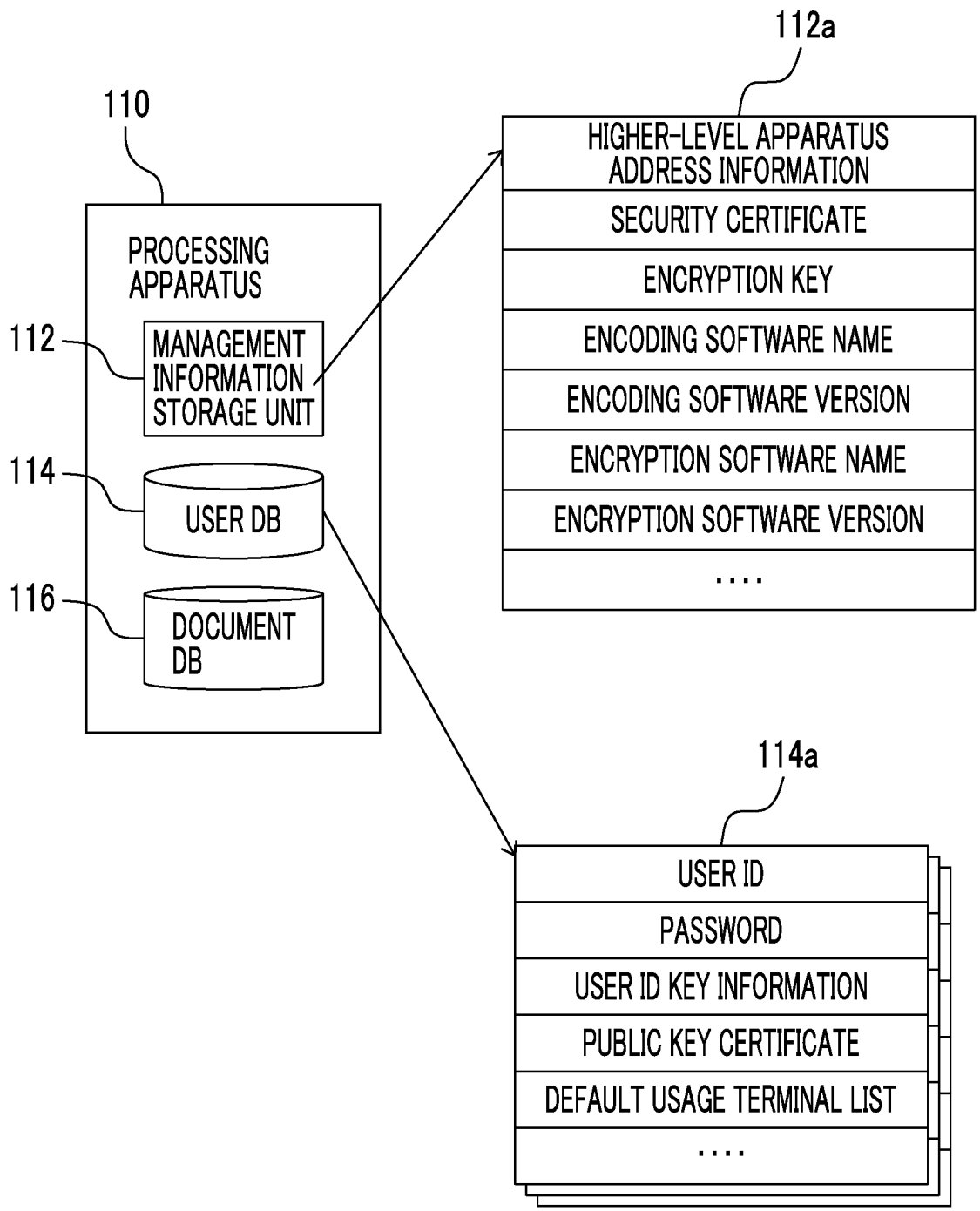
FIG. 7 is a diagram showing a configuration of the processing apparatus and data content possessed by the processing apparatus.

Next, a database group held by the processing apparatus 110 will be described with reference to FIG. 7. As shown in the drawing, the processing apparatus 110 includes a management information storage unit 112, a user DB 114, and a document DB 116.

The management information storage unit 112 stores management information 112*a*. The management information 112*a* includes items such as higher-level apparatus address information, a security certificate, an encryption key, an encoding software name, an encoding software version, an encryption software name, and an encryption software version. The higher-level apparatus address information is information on each communication address (for example, an IP address, a URL, or the like) of the higher-level apparatus that manages the processing apparatus 110. The management system 200 and each of the servers 210 to 240 in the management system 200, or an in-organization management system 150, which will be described later, and each of the servers 152 to 156 in the in-organization management system 150 are examples of the higher-level apparatus. The security certificate is a digital certificate used in a case where the processing apparatus 110 performs public key infrastructure-based secure communication with another apparatus on the network. The processing apparatus 110 holds the security certificate of each higher-level apparatus which frequently becomes a partner for communication. In addition, a security certificate of each user who uses the creation terminal 102 or the usage terminal 104 may be held. The encryption key is an encryption key of the processing apparatus 110, which is used for a purpose of encryption or decryption in a case where the processing apparatus 110 communicates with another device on the network, digital signature (or generation of certification information similar thereto) by the processing apparatus 110, or the like, and, for example, is a pair of a private key and a public key granted to the processing apparatus 110 in the public key infrastructure. The encoding software and the encryption software are software installed in the processing apparatus 110 to perform encoding (conversion into the dedicated format) and encryption, respectively.

The user DB 114 stores user information 114*a* of each user (in other words, a user who sets the processing apparatus 110 as the "default processing apparatus") registered in the processing apparatus 110. The user information 114*a* of each registered user includes items such as the user ID, the password, the user ID key information, the public key certificate, and the default usage terminal list. The items are described in the description of the data held by the above-described user ID server 210 (see FIG. 4).

The document DB 116 stores the eDoc file generated by the processing apparatus 110 and the metadata corresponding to the eDoc file. Since the eDoc file and the metadata include information on the DID, association is possible. In addition, original data (received from the creation terminal 102) before being encoded into the eDoc may be registered in the document DB 116 in association with the DID of the eDoc.

For each user who uses the terminals, the creation terminal 102 and the usage terminal 104 store the authentication information (the user ID, the password, or the like) on the user, an ID of the default processing apparatus, address information on the default processing apparatus, address information on the higher-level apparatus (for example, the management system 200 or the in-organization management system 150 which will be described later), a security certificate of the processing apparatus or the higher-level apparatus, the encryption key used for the communication path encryption, and the like.

Flow of Processing of System

Ina case where the processing apparatus 110 is installed on the local network 108, a maintenance worker who performs maintenance of the processing apparatus 110 registers information on the user who uses the processing apparatus 110 and information on the creation terminal 102 or the usage terminal 104, in which there is a possibility of being used by the user, for the processing apparatus 110. The registered information on the user is also transferred to and registered in the user ID server 210 (or a local user ID server 152 which will be described later) which is the higher-level apparatus. Note that, in a case where the number of users who use the processing apparatus 110 increases or decreases after installation, the maintenance worker performs a work of newly and additionally registering information on an increased number of users in the processing apparatus 110 or deleting registration of information on a decreased number of users. The addition or the deletion is also notified to the higher-level apparatus such as the user ID server 210, and information held by the higher-level apparatus is updated according to the notification. In addition, the maintenance worker installs software (for example, having a form of a device driver of the processing apparatus 110) for performing processing of requesting the processing apparatus 110 to register and distribute the document in and to each creation terminal 102. In addition, the maintenance worker registers information (for example, an apparatus name, a communication address, or wireless access establishment) for communicating with the processing apparatus 110 in each usage terminal 104.

Hereinafter, a flow of processing by the document management system according to the exemplary embodiment will be described.

(0) The DID server 220 grants a DID (document ID) issuance right and an accompanying issuance frame (the number of documents) to the processing apparatus 110 in the local system 100 in advance. The DID issuance right is not unlimited and is limited to an issuance frame of the management system 200. That is, in a case of the number of documents up to a number indicated by the issuance frame granted from the management system 200, the processing apparatus 110 is capable of granting the DIDs based on the simultaneously granted issuance rights. Ina case where the issuance frame is used up, an issuance right and an issuance frame, which are new, are granted to the processing apparatus 110 from the management system 200.

(1) In a case where the user wants to register (that is, distribute) the document in the document management system of the exemplary embodiment, the user instructs the creation terminal 102 to register the document (for example, instructs "register" on a menu of an application). The creation terminal 102 which receives the instruction requests the user authentication. The authentication may be performed by inputting the user ID and the password, or may be performed in such a way that the user brings the authentication device 130 close to a vicinity of a card reader unit of the creation terminal 102. The user authentication may be performed by the creation terminal 102 or may be performed by the processing apparatus 110 that is a registration destination of the document. Further, the user selects a document to be registered in the document management system from the documents stored in the creation terminal 102 and instructs to register the document.

In a case where the creation terminal 102 (more specifically, a registration processing program installed in the creation terminal 102) receives an instruction to register the document from the user, the creation terminal 102 receives input of an item (for example, a distribution destination of the document) which should be designated by the user in the attribute data for the document. Here, designation of a combination of the user and the usage terminal 104 may be received as the distribution destination. In this case, in a case where the combination of the user and the usage terminal 104 used by the user matches the combination designated as the distribution destination, the user is permitted to instruct to execute the processing, such as printing, on the document.

(2) The creation terminal 102 transmits the attribute data, in which an attribute item, such as the distribution destination input by the user, is combined with another attribute item generated by the creation terminal 102 (for example, information on a registrant, a creation date and time, or the like), to the processing apparatus 110, together with data of the document. The attribute data includes access right information representing that the usage right to print the eDoc file is granted to the distribution destination user and the usage right to perform the browsing, the editing, or the like on the eDoc file in the usage terminal 104 of the user is not granted. Note that, the creation terminal 102 may include a driver that converts various formats of documents, which are created by various applications, into a uniform format capable of being handled on a side of the usage terminal 104. For example, in a case of data indicating a static document image such as word processing data, spreadsheet, or CAD data, the driver converts the data into a document expressed in a page description language, similarly to a printer driver. In addition, for example, in a case where the original data is voice data, the driver converts the voice data into data (document) in a specific voice data format corresponding to the document management system (particularly, the usage terminal 104) of the exemplary embodiment.

(3) The processing apparatus 110 receives the document which is a registration target, the document being transmitted from the creation terminal 102.

(4) The processing apparatus 110 generates the protected document (eDoc file) by performing the protection processing on the document which is the registration target and is received from the creation terminal 102. In the generation, the eDoc file is generated in such a way that the received document is encoded into the dedicated format of the document management system of the exemplary embodiment and the encoded data is encrypted using the generated encryption key. The order of encoding and encryption may be reversed. In addition, the processing apparatus 110 also grants a unique DID to the eDoc file. The DID includes information (for example, the issuance right key) for certifying a fact of being based on the issuance right received from the management system 200 and information (for example, an issuance certification key) for certifying a fact of being granted by the processing apparatus 110. The generated DID is embedded in the eDoc file (for example, as one item of a property of the file).

In addition, the processing apparatus 110 generates the metadata corresponding to the generated eDoc file. The metadata includes attribute data received from the creation terminal 102 together with the document, and values of the attribute items (for example, the DID, the ID of the own processing apparatus, the encoding date and time, and encryption key information) generated by the own processing apparatus 110. Since the attribute data includes access right information, the metadata includes the access right information. The encryption key information included in the metadata is information indicating a key for releasing encryption of the eDoc file. In a case where a common key method is used for the encryption, the encryption key information is information indicating the common key. However, in a case where the common key is included in the metadata in plain text, there is a concern that the common key is misused by eavesdropping or interception, and thus the common key encrypted with the public key of the distribution destination user is embedded in the metadata as the encryption key information.

In addition, the processing apparatus 110 stores the generated eDoc file and the metadata in a built-in database.

(5) The processing apparatus 110 transmits the DID generated earlier to the DID server 220. The DID server 220 stores the DID transmitted from the processing apparatus 110. In addition, the processing apparatus 110 transmits the generated metadata to the metadata server 230 and registers the metadata in the metadata server 230. The metadata server 230 stores the received metadata.

(6) The processing apparatus 110 distributes the generated eDoc file to the usage terminal 104 designated as the distribution destination. The distribution may be a push type, a pull type, or both of the push type and the pull type (for example, push distribution is performed in a case where the eDoc is created, and the usage terminal 104, which is not operated and does not perform reception at that time, receives the eDoc through the pull type distribution). The distribution is performed through the local network 108 in the local system 100. For example, the processing apparatus 110 transmits a distribution preparation completion notification for the eDoc to the usage terminal 104 of the distribution destination of the generated eDoc file. The notification includes the information on the DID generated earlier and the document name of the eDoc.

(7) The usage terminal 104 receives the eDoc file distributed from the processing apparatus 110.

(8) The eDoc file received by the usage terminal 104 is not capable of being processed by the usage terminal 104. For example, the eDoc file is not capable of being browsed, edited, or printed, in the usage terminal 104. For example, although the name of the eDoc file is displayed on the usage terminal 104, content of the eDoc file is not displayed on the usage terminal 104. That is, the eDoc file is not capable of being opened in the usage terminal 104. As above, the usage terminal 104 prohibits the processing apparatus 110 from browsing and editing the eDoc file.

As another example, the processing apparatus 110 may not distribute the generated eDoc file to the usage terminal 104 designated as the distribution destination, and may distribute information prompting the distribution destination user to have the user authentication for permission of giving the instruction to execute the processing, such as printing, on the eDoc file, to the usage terminal 104 designated as the distribution destination. For example, the processing apparatus 110 distributes information, which indicates that the eDoc file capable of being printed according to the instruction from the distribution destination user is generated, to the usage terminal 104. In addition, the processing apparatus 110 may distribute the name, the title, or the DID of the generated eDoc file to the usage terminal 104. The usage terminal 104 receives and displays the pieces of information. For example, the name or the like of the eDoc file capable of being printed according to the instruction of the distribution destination user is displayed on the usage terminal 104.

In a case where the user wants to instruct to execute the processing, such as printing, on the eDoc file using the usage terminal 104, the user instructs to execute the processing, such as printing, on the eDoc file after bringing the authentication device 130 of the user close to a card reader unit of the usage terminal 104 and receiving the user authentication. For example, the usage terminal 104 displays a list screen that displays a list of eDoc files distributed to the processing apparatus 110. On the list screen, for example, the name of the eDoc file or the like is displayed. The user designates the eDoc file which is a processing target on the list screen and instructs to execute the processing. The usage terminal 104, which receives the instruction of execution, accesses the management system 200 and requests the metadata of the eDoc file. The request includes the DID of the eDoc file.

(9) The metadata server 230 transmits the newest metadata of the eDoc file requested by the usage terminal 104 to the usage terminal 104.

(10) In a case where the usage terminal 104 receives the requested metadata from the management system 200, the usage terminal 104 determines whether or not the distribution destination information, which is included in the metadata, includes a combination of the usage terminal 104 and the user (that is, the user who is authenticated by the authentication device 130) who currently uses the usage terminal 104. In a case where the distribution information includes the combination, the authentication of the user for the eDoc file is successful. In this case, the user is permitted to use the eDoc file using the usage terminal 104 according to the usage right represented by the access right information included in the metadata. As described above, the access right information is information indicating that the usage right to print the eDoc file is granted to the distribution destination user but the usage right to perform the browsing or the editing on the eDoc file in the usage terminal 104 is not granted. Therefore, the user has a right to instruct to execute the printing of the eDoc file using the usage terminal 104, and does not have a right to perform the browsing or the editing on the eDoc file. The usage terminal 104 transmits instruction information indicating the instruction of execution of the printing of the eDoc file and information indicating that user authentication is successful to the processing apparatus 110. In a case where the user authentication is successful, the user is permitted to give an instruction to execute printing for the eDoc file to the processing apparatus 110 different from the usage terminal 104. The information indicating that the user authentication is successful is information indicating that the user who uses the usage terminal 104 is permitted to give the instruction to execute printing for the eDoc file to the processing apparatus 110 which is different from the usage terminal 104. The instruction information includes the DID of the eDoc file on which the processing, such as printing, is performed. The access right information represents that the distribution destination user does not have the right to perform the browsing or the editing on the eDoc file. Therefore, even in a case where the user authentication is successful, the content of the eDoc file is not displayed on the usage terminal 104, and thus the user is not capable of performing the browsing or the editing on the content of the eDoc file in the usage terminal 104. In a case where the distribution destination information does not include the combination, the user does not have the right to instruct to execute the processing, such as printing, on the eDoc file using the usage terminal 104, and thus the usage terminal 104 does not transmit the instruction information and the information indicating that the user authentication is successful to the processing apparatus 110, and displays an error message indicating that there is no right to instruct to execute the processing.

(11) In a case where the processing apparatus 110 receives the instruction information and the information indicating that the user authentication is successful from the usage terminal 104, the processing apparatus 110 executes the processing on the eDoc file having the DID included in the instruction information. For example, the processing apparatus 110 decrypts the eDoc file using the encryption key information included in the metadata and prints the eDoc file. The processing apparatus 110 may transmit the eDoc file to a printing apparatus other than the processing apparatus 110 and may cause the printing apparatus to print the eDoc file. For example, the processing apparatus 110 may transmit the eDoc file to the printing apparatus disposed closest to the usage terminal 104, or may transmit the eDoc file to a predetermined printing apparatus. In addition, in a case where the printing of the eDoc file is completed, the processing apparatus 110 may transmit information indicating that the printing of the eDoc file is completed to the usage terminal 104 used for the print instruction. In this case, the information indicating that the printing of the eDoc file is completed is displayed on the usage terminal 104.

In a case where the eDoc file is distributed to the usage terminal 104, the usage terminal 104 may transmit the instruction information, the information indicating that the user authentication is successful, and the eDoc file to the processing apparatus 110. In this case, the processing apparatus 110 prints the eDoc file. In a case where the eDoc file is not distributed to the usage terminal 104, the processing apparatus 110 has the DID of the eDoc file which is the printing target, and prints the eDoc file stored in the processing apparatus 110. Even in a case where the eDoc file is distributed to the usage terminal 104, the processing apparatus 110 may print the eDoc file stored in the processing apparatus 110.

In a case where the user whose user authentication is successful designates the processing apparatus 110 which will perform the printing, the instruction information and the information indicating that the user authentication is successful are transmitted to the designated processing apparatus 110. In a case where the processing apparatus 110 stores the eDoc file, the processing apparatus 110 prints the eDoc file. In a case where the processing apparatus 110 does not store the eDoc file, the processing apparatus 110 acquires the eDoc file from the processing apparatus 110 that stores the eDoc file and prints the eDoc file. In a case where the eDoc file is distributed to the usage terminal 104, the eDoc file may be transmitted from the usage terminal 104 to the processing apparatus 110 that will perform the printing, and the processing apparatus 110 may print the eDoc file.

(12) In a case where the processing, such as printing, is executed on the eDoc file by the processing apparatus 110, the processing apparatus 110 associates processed information indicating that the eDoc file is processed by the processing apparatus 110 with the eDoc file, and transmits the processed information to the DID server 220. Specifically, the processing apparatus 110 associates the DID of the eDoc file, on which the processing, such as printing, is executed, with the processed information, and transmits the information to the DID server 220. The DID server 220 stores and manages the DID and the processed information through association. Therefore, a fact that the eDoc file having the DID is printed is managed.

Although the document management system shown in FIG. 1 is a system having a hierarchical structure of two hierarchies including a group of the processing apparatuses 110 and the management system 200, a system having three or more hierarchies is possible by inserting a hierarchy of a new management system. FIG. 8 shows a system having three hierarchies.

In an example shown in FIG. 8, a plurality of local systems 100 exist in an in-organization network which is a private network of an organization such as a company. Further, the in-organization management system 150 is provided in the in-organization network. The in-organization management system 150 manages a processing in the organization and information necessary for the processing in the document management system. That is, the management system 200 is operated by a service provider of the document management system to manage information and processing for a plurality of organizations that use the document management system, and the in-organization management system 150 manages some of the information and the processing, which are related to the organization, under management of the management system 200.

The in-organization management system 150 includes a local user ID server 152, a local DID server 154, and a local metadata server 156.

The local user ID server 152 manages information on users who are registered in the document management system among members of the organization. The information on the individual users held by the local user ID server 152 is the same as the information on the general users held by the user ID server 210 shown in FIG. 4. In a case where the user who uses the processing apparatus 110 (that is, the user who sets the processing apparatus 110 as the "default processing apparatus") is registered in the processing apparatus 110, the processing apparatus 110 sends the information on the registered user to the local user ID server 152 in the organization. The local user ID server 152 store the received information on the user and sends the information on the user to the user ID server 210 of the central management system 200 through the wide area network 10. The user ID server 210 stores the received information on the user. In addition, in a case where the information on the user registered in the processing apparatus 110 is changed, a manager or the like changes the information on the user for the processing apparatus 110. The processing apparatus 110 transmits information on changed content of the information on the user (for example, the user ID, an item name of a changed information item, and a value obtained after the item is changed) to the local user ID server 152, and the local user ID server 152 changes the information on the user, which is stored in the local user ID server 152 according to the changed content which is received. In addition, the local user ID server 152 sends the received information on the changed content to the central user ID server 210, and the user ID server 210 changes the information on the user held by the user ID server 210 according to the sent information.

The local DID server 154 receives and stores the DID issued by the processing apparatus 110 in each local system 100 belonging to the in-organization network of the organization. The information held by the local DID server 154 is the same as the information held by the DID server 220 shown in FIG. 5. In addition, the local DID server 154 sends the DID information received from the processing apparatus 110 to the central DID server 220, and the DID server 220 stores the information. In addition, the DID issuance right and the issuance frame are granted to the local DID server 154 from the central DID server 220, and, within a range of the issuance frame, the DID issuance right and the issuance frame are granted to each processing apparatus 110 under management based on the issuance right.

The local metadata server 156 receives and stores the metadata of the eDoc generated by the processing apparatus 110 in each local system 100 belonging to the in-organization network of the organization. Information held by the local metadata server 156 is the same as the information held by the metadata server 230. In addition, the local metadata server 156 sends the metadata received from the processing apparatus 110 to the central metadata server 230, and the metadata server 230 stores the metadata.

Even in the document management system shown in FIG. 8, the user is not capable of performing the browsing on the content of the eDoc file in the usage terminal 104. However, in a case where the user authentication is successful in the usage terminal 104, the user is permitted to give the instruction to execute the processing, such as printing, on the eDoc file to the processing apparatus 110.

In the above exemplary embodiment, the document created in the creation terminal 102 is printed. However, the eDoc, which is stored in the processing apparatus 110 in advance, may be printed. Hereinafter, a flow of the processing will be described in detail.

First, in a case where the user wants to instruct to execute the processing, such as printing, on the eDoc file using the usage terminal 104, the user instructs to execute the processing on the eDoc file after bringing the authentication device 130 of the user close to the card reader unit of the usage terminal 104 and receiving the user authentication. For example, the usage terminal 104 displays the list screen that displays the list of eDoc files stored in the processing apparatus 110. On the list screen, for example, the name of the eDoc file or the like is displayed. The user designates the eDoc file which is a processing target on the list screen and instructs to execute the processing. In the system shown in FIG. 1, the usage terminal 104 that receives the instruction of execution accesses the management system 200 and requests the metadata of the eDoc. The request includes the DID of the eDoc. In the system shown in FIG. 8, the usage terminal 104 accesses the in-organization management system 150 and requests the metadata of the eDoc.

In the system shown in FIG. 1, the metadata server 230 transmits the newest metadata of the eDoc requested by the usage terminal 104 to the usage terminal 104. In the system shown in FIG. 8, the local metadata server 156 transmits the newest metadata of the requested eDoc to the usage terminal 104.

In a case where the usage terminal 104 receives the requested metadata from the metadata server 230 or the local metadata server 156, the usage terminal 104 determines whether or not a combination of the usage terminal 104 and a user (that is, a user who has been authenticated by the authentication device 130) who currently uses the usage terminal 104 exists in the distribution destination information included in the metadata.

In a case where the distribution information includes the combination, the user authentication for the eDoc file is successful, and the usage terminal 104 transmits the instruction information and the information indicating that the user authentication is successful to the processing apparatus 110. The instruction information includes the DID of the eDoc file on which the processing, such as printing, is performed. Even in a case where the user authentication is successful, the content of the eDoc file is not displayed in the usage terminal 104, and the user is not capable of performing the browsing on the content of the eDoc file using the usage terminal 104. In a case where the distribution destination information does not include the combination, the user does not have the right to instruct to execute the processing, such as printing, on the eDoc file using the usage terminal 104, and thus the usage terminal 104 does not transmit the instruction information and the information indicating that the user authentication is successful to the processing apparatus 110, and displays an error message indicating that there is no right to instruct to execute the processing.

In a case where the processing apparatus 110 receives the instruction information and the information indicating that the user authentication is successful from the usage terminal 104, the processing apparatus 110 specifies the eDoc file having the DID included in the information from the eDoc file group stored in the processing apparatus 110, and executes the processing, such as printing, on the eDoc file. For example, the processing apparatus 110 decrypts the eDoc file using the encryption key information included in the metadata and prints the eDoc file.

Further, the processing apparatus 110 generates a new DID of the specified eDoc file and grants the new DID to the eDoc file, thereby generating a new eDoc file. In addition, the processing apparatus 110 generates new metadata including the new DID. Although content of the new eDoc file are the same as the content of the specified eDoc file, the DIDs are different from the metadata.

In the system shown in FIG. 1, the processing apparatus 110 transmits the generated new DID to the DID server 220, and transmits the generated new metadata to the metadata server 230. In the system shown in FIG. 8, the processing apparatus 110 transmits the new DID to the local DID server 154 and transmits the new metadata to the local metadata server 156.

In addition, in the system shown in FIG. 1, the processing apparatus 110 associates the processed information indicating that the processing, such as printing, is performed on the eDoc file by the processing apparatus 110 with the new DID generated earlier, and transmits the pieces of information to the DID server 220. The DID server 220 stores and manages the new DID and the processed information through association. In the system shown in FIG. 8, the processing apparatus 110 associates the new DID with the processed information and transmits the pieces of information to the local DID server 154. The local DID server 154 stores and manages the new DID and the processed information through association.

In a case where a distributor of the document is different from the utilizer of the document (that is, the user who instructs to execute the processing, such as printing, using the usage terminal 104), the processing apparatus 110 may inquire about whether or not to permit a distributor of the specified eDoc file to execute the processing, such as printing, and may execute the processing, such as printing, on the eDoc file in a case where permission is obtained from the creator. For example, the processing apparatus 110 specifies the distributor based on the distributor ID included in the metadata of the eDoc file, and transmits the information indicating the inquiry to the creation terminal 102 used by the specified distributor. In a case where the distributor is permitted to execute the processing, such as printing, using the creation terminal 102 of the distributor, information indicating the permission is transmitted from the creation terminal 102 to the processing apparatus 110. In a case where the processing apparatus 110 receives the information indicating the permission, the processing apparatus 110 executes the processing, such as printing, on the eDoc file. In a case where the distributor prohibits the processing, such as printing, from being executed using the creation terminal 102 of the distributor, information indicating the prohibition is transmitted from the creation terminal 102 to the processing apparatus 110. In a case where the processing apparatus 110 receives the information indicating prohibition, the processing apparatus 110 does not execute processing, such as printing, on the eDoc file. In addition, in a case where the processing apparatus 110 does not receive the information indicating permission from the creation terminal 102 within a predetermined time after transmitting the information indicating the inquiry to the creation terminal 102, the processing apparatus 110 may not execute the processing, such as printing, on the eDoc file.

In the above-described document management system according to the exemplary embodiment, the processing is not executed on the eDoc file in the usage terminal 104 used by the user who uses the eDoc file for the authentication, and thus there is a low possibility that the content of the eDoc file is leaked to another person in the usage terminal 104, compared to a case where the processing is executed on the eDoc file in the usage terminal 104. In addition, even though the processing is not executed on the eDoc file in the usage terminal 104, the processing can be executed on the eDoc file the processing apparatus 110 or another apparatus.

Processing of Generating New eDoc by Reading Manuscript

Next, processing of generating a new eDoc by reading a manuscript will be described.

For example, the eDoc file is printed on paper. The printing may be performed by the processing apparatus 110 or another printing apparatus. In addition, as described in the above exemplary embodiment, the printing may be performed in accordance with an instruction from the user whose user authentication is successful in the usage terminal 104 or, while not being limited to the example, may be performed in accordance with the instruction of printing from another terminal or another user. That is, here, the printing is not limited to the above exemplary embodiment and may be performed by any of methods or apparatuses.

Hereinafter, for convenience of description, it is assumed that the paper on which the eDoc file is printed is referred to as a "manuscript A". That is, the manuscript A is created by printing the eDoc file. The manuscript A is, for example, a paper document.

The content of the eDoc file is printed on the manuscript A. Further, additional information is printed on the manuscript A. The additional information includes, for example, a DID of the printed eDoc file, identification information on an apparatus that performed the printing (for example, the processing apparatus ID of the processing apparatus 110 that performs the printing), a user ID of a user who instructs the printing, a user ID of a user who actually performs the printing, the information indicating a date and time at which the printing is performed, and the other information (for example, a figure such as a watermark). The additional information may be encoded and a code (for example, a barcode or a two-dimensional code) may be printed.

Next, in a case where the manuscript A is read by a reading apparatus, such as a scanner or a camera, a new document (for example, scan data generated through scanning by the scanner) is generated. The reading apparatus may be provided in the processing apparatus 110 or may not be provided in the processing apparatus 110. Hereinafter, for convenience of description, a new document generated by reading the manuscript A will be referred to as a "document B".

The document B represents content of the printed original eDoc file and additional information added in a case where the eDoc file is printed. In addition, in a case where text, a symbol, a figure, and the like are written in the manuscript A, information representing the written text and the like is also represented in the document B.

The processing apparatus 110 transmits the document B generated by reading the manuscript A to the DID server 220 or the local DID server 154.

Next, in a case where a text recognition processing, such as an Optical Character Recognition (OCR) processing, is applied to the document B, the DID of the printed original eDoc file is specified from the document B. Since the additional information is represented in the document B, the DID is specified from the additional information. In addition, in a case where a code, such as a barcode or a two-dimensional code, is represented in the document B, the DID may be read from the code. The text recognition processing may be performed by the management system 200, may be performed by the in-organization management system. 150, or may be performed by another apparatus or system.

Next, the content of the eDoc file, which has the specified DID and is stored in the processing apparatus 110, is compared with content of the document B generated through reading. For example, the DID server 220 or the local DID server 154 acquires the eDoc file having the specified DID from the processing apparatus 110, and compares the content of the acquired eDoc file with the content of the document B. At this time, the DID server 220 or the local DID server 154 decrypts the acquired eDoc file, and compares content of the document generated through the decryption with the content of the document B.

In a case where difference exists between the contents, the DID server 220 or the local DID server 154 instructs the processing apparatus 110 to grant a new DID to the document B and to encode the document B (that is, an encryption process). In a case where there is no difference exists between the contents, the DID server 220 or the local DID server 154 does not give the instruction to the processing apparatus 110.

In a case where the difference between the contents is less than a predetermined threshold, the DID server 220 or the local DID server 154 instructs the grant of the new DID and the execution of encoding, and, in a case where the difference between the contents is equal to or larger than the threshold, the instruction may not be given. In a case where the difference is equal to or larger than the threshold, there is a possibility that the manuscript A is forged and the document B is generated. In such a case, the new DID is not granted to the document B.

Note that, in a case where the original eDoc file is printed, the additional information, such as a watermark that is not included in the content of the eDoc file, is printed on the paper, so that the additional information is represented on the document B which is generated by reading the manuscript A generated by the printing. Since the additional information, such as the watermark, is predetermined information, the DID server 220 or the local DID server 154 removes the additional information, such as the watermark, from the document B, and compares the content of the document B in a state in which the additional information is removed with the content of the printed original eDoc file. Therefore, the documents can be compared in a state in which the additional information does not exist.

For example, in a case where the text, the symbol, the figure, or the like is written on the manuscript A, the written text or the like is also represented on the document B, so that the difference occurs between the content of the document B and the content of the printed original eDoc file.

In a case where the processing apparatus 110 is granted with the new DID and receives an encoding execution instruction from the DID server 220 or the local DID server 154, the processing apparatus 110 encodes the document B and encrypts the encoded data, thereby generating a new eDoc file (hereinafter, referred to as an "eDoc file B"). In addition, the processing apparatus 110 generates the new DID and grants the new DID to the eDoc file B. In addition, the processing apparatus 110 generates new metadata including the new DID.

The processing apparatus 110 transmits the DID of the eDoc file B to the DID server 220 or the local DID server 154, and transmits the metadata of the eDoc file B to the metadata server 230 or the local metadata server 156. For example, the DID server 220 or the local DID server 154 manages the DID of the eDoc file B and the DID specified through the text recognition processing (that is, the DID of the printed original eDoc file) through association. As a result, the new eDoc file B generated by reading the manuscript and the printed original eDoc file are associated and managed. Therefore, for example, a relationship (for example, presence or absence of falsification) between the new eDoc file B and the original eDoc file can be checked.

Further, the processing apparatus 110 may include data representing the difference between the content of the printed original eDoc file and the content of the eDoc file B (that is, the content of the document B) in the metadata of the eDoc file B. The data representing the difference is data from which the additional information added to the difference in printing is removed. For example, in a case where information, such as text, is written in the manuscript A, the written information is represented in the eDoc file B. However, since the written information is not represented in the printed original eDoc file, the data representing the difference is data representing information, such as text, written in the manuscript A.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display; and
a processor configured to:
   authenticate a user designated as a recipient of a document;
   receive the document from a processing apparatus, wherein the processing apparatus receives, from an external apparatus, the document and information of the user designated as the recipient of the document, and wherein the processing apparatus is different from the information processing apparatus;
   control to enable the authenticated user to instruct the processing apparatus to process the received document; and
   control not to display, on the display, content of the received document stored in the information processing apparatus.

2. The information processing apparatus of claim 1, wherein the enabling and the not permitting are in response to a determination that the user has been granted a first type of access right.

3. The information processing apparatus of claim 2, wherein the processor is configured to:
in response to a determination that the user has been granted a second type of access right to the document, control to enable the authenticated user to access the received document from the information processing apparatus.

4. The information processing apparatus of claim 3, wherein the processor is configured to send, to the processing apparatus, information indicating that the user has been authenticated.

5. The information processing apparatus of claim 3, wherein the processing of the received document is printing of the received document.

6. The information processing apparatus of claim 2, wherein the processor is configured to send, to the processing apparatus, information indicating that the user has been authenticated.

7. The information processing apparatus of claim 2, wherein the processing of the received document is printing of the received document.

8. The information processing apparatus of claim 1, wherein the processor configured to receive recipient information indicating a combination of a recipient of the document and a device on which the recipient is authorized to use the document,
wherein the enabling and the not permitting are in response to a determination that a combination of the information processing apparatus and the user corresponds to the combination indicated by the recipient information.

9. The information processing apparatus of claim 8,
wherein the processor is configured to send, to the processing apparatus, information indicating that the user has been authenticated.

10. The information processing apparatus of claim 8,
wherein the processing of the received document is printing of the received document.

11. The information processing apparatus of claim 1,
wherein the processor is configured to send, to the processing apparatus, information indicating that the user has been authenticated.

12. The information processing apparatus of claim 1,
wherein the processor is configured to receive information for prompting the user to request user authentication of the user to be able to instruct the processing apparatus to process the received document.

13. The information processing apparatus of claim 1,
wherein the processor is configured to prohibit the authenticated user from viewing and editing of the received document stored in the information processing apparatus.

14. The information processing apparatus of claim 1,
wherein the processing of the received document is printing of the received document.

15. An information processing system comprising a first apparatus, a second apparatus, and a third apparatus,
wherein the first apparatus comprises a first processor configured to send, to the third apparatus, a document and information of a user designated as a recipient of the document,
wherein the second apparatus comprises a display and a second processor configured to:
authenticate the user designated as the recipient of the document;
control to enable the authenticated user to instruct the third apparatus having the document received from the first apparatus to process the document; and
control not to display, on the display, content of the document.

16. The information processing system of claim 15,
wherein the first processor is configured to send, to the third apparatus, recipient information indicating a combination of a recipient of the document and a device on which the recipient is to receive the document,
wherein the second processor is configured to receive the recipient information, and
wherein the enabling is in response to a determination that a combination of the second apparatus and the authenticated user corresponds to the combination indicated by the recipient information.

17. The information processing system of claim 15,
wherein the third apparatus comprises a third processor configured to send information indicating that the document has been processed to a managing apparatus managing the third apparatus.

18. The information processing system of claim 17,
wherein the third processor is configured to, in response to the processing being performed by the third apparatus, create a new document by assigning new identification information to the document.

19. An information processing system comprising a first apparatus, a second apparatus, and a third apparatus,
wherein the first apparatus comprises a first processor configured to send a document to the third apparatus,
wherein the third apparatus comprises a third processor configured to create a protected document from the document,
wherein the second apparatus comprises a second processor configured to:
authenticate a user; and
enable the authenticated user to instruct the third apparatus to print the protected document, and
wherein the third processor is configured to:
create a new protected document from a new document obtained by scanning a printed copy of the protected document.

20. The information processing system of claim 19,
wherein the creating of the new protected document is in response to detecting of a difference between the document and the new document.

21. A method comprising:
at an information processing apparatus with a display:
authenticating a user designated as a recipient of a document;
receiving the document from a processing apparatus, wherein the processing apparatus receives, from an external apparatus, the document and information of the user designated as the recipient of the document, and wherein the processing apparatus is different from the information processing apparatus;
controlling to enable the authenticated user to instruct the processing apparatus to process the received document; and
controlling not to display, on the display, content of the received document stored in the information processing apparatus.

* * * * *